Figure 1:
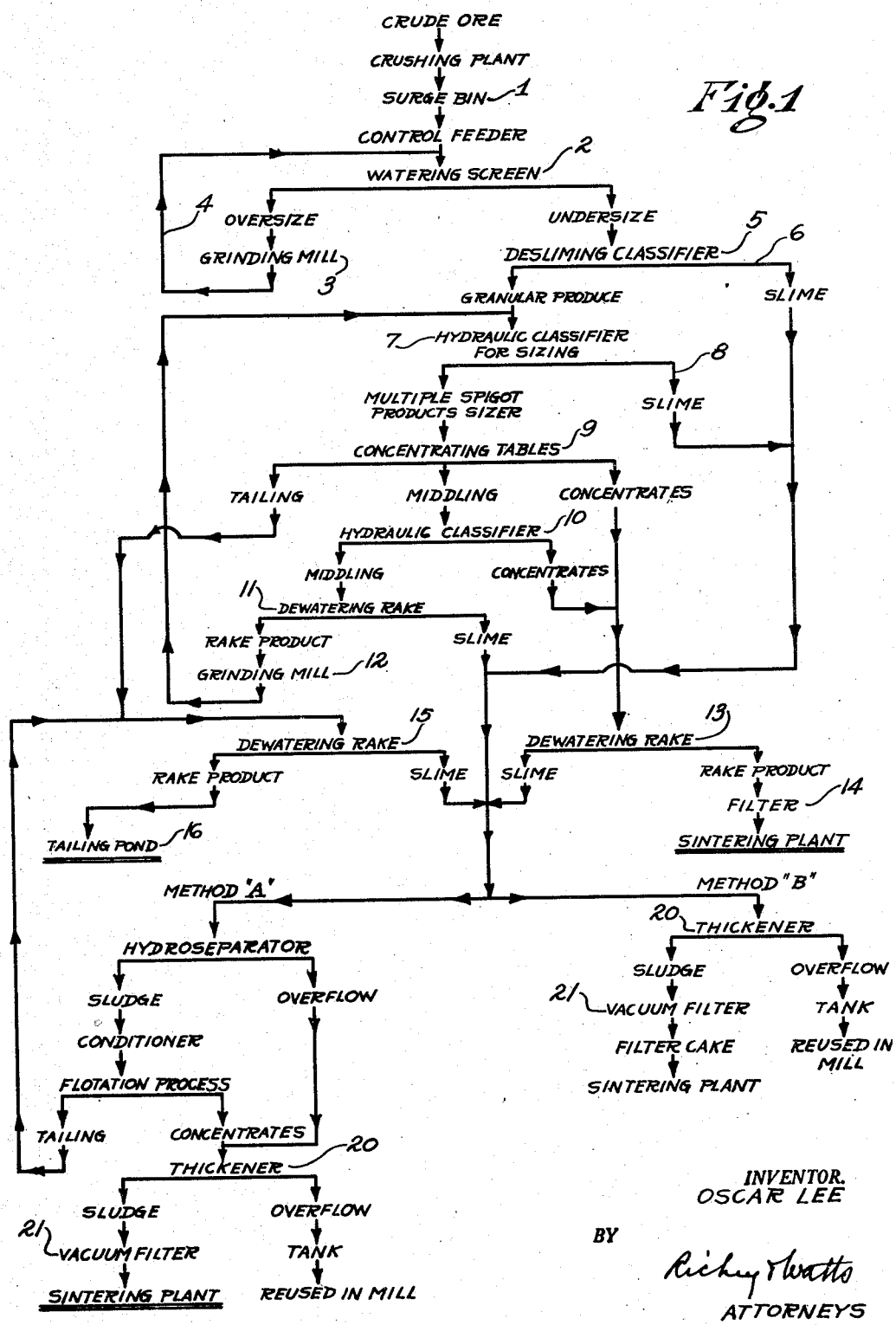

July 11, 1950     O. LEE     2,514,958
CONCENTRATION OF OOLITIC IRON ORES
Filed Dec. 26, 1947     2 Sheets-Sheet 1

INVENTOR.
OSCAR LEE
BY
Richey T Watts
ATTORNEYS

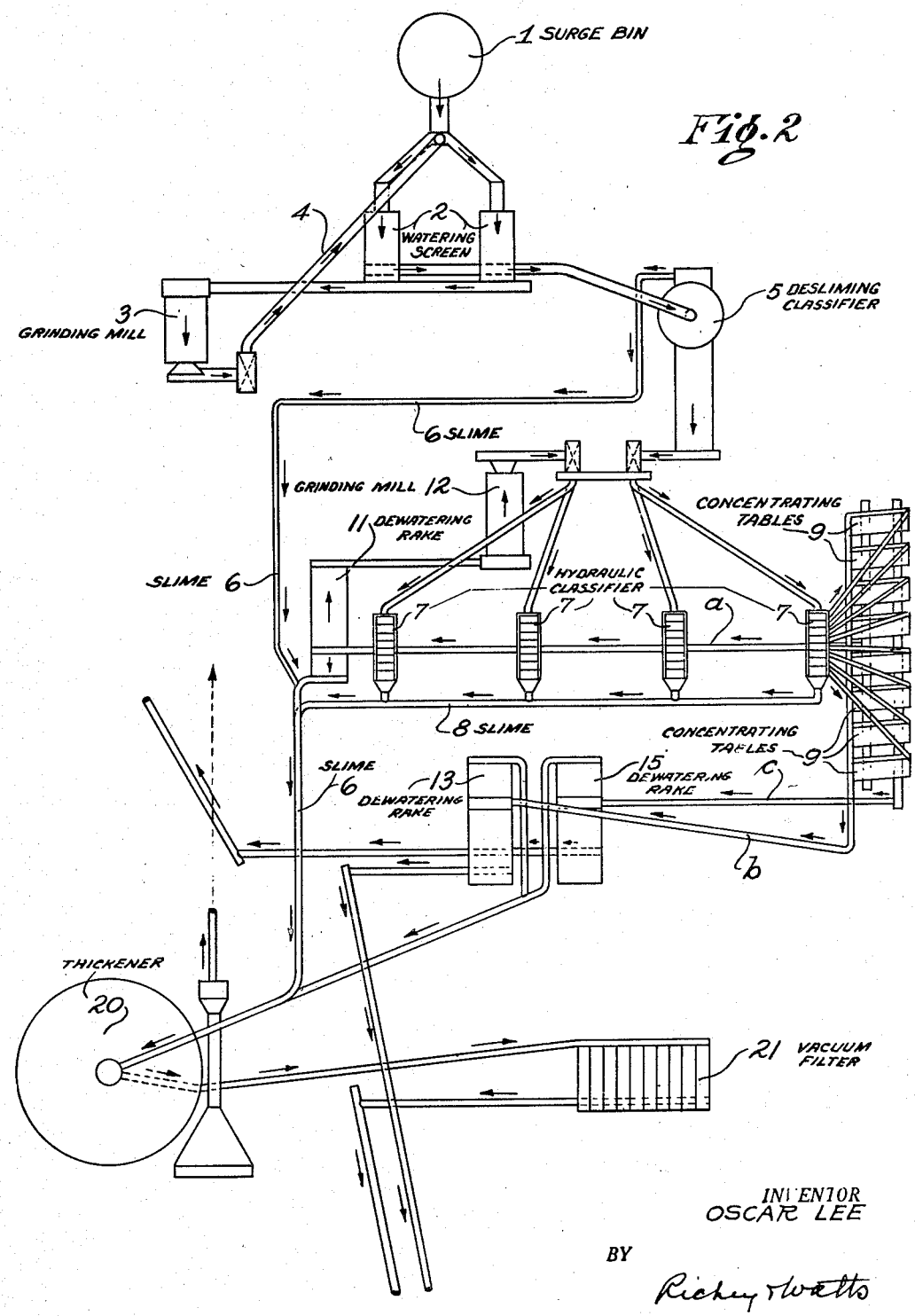

UNITED STATES PATENT OFFICE 2,514,958

CONCENTRATION OF OÖLITIC IRON ORES

Oscar Lee, Shaker Heights, Ohio, assignor to Republic Steel Corporation, Cleveland, Ohio, a corporation of New Jersey Application December 26, 1947, Serial No. 794,001

4 Claims. (Cl. 209—12)

This invention relates generally to the art of recovering iron values from iron ores and is particularly concerned with a new method of separating and concentrating iron values in oölitic iron ores.

Oölitic iron ores contain much non-metallic material which must be separated before the iron values can be used commercially in blast furnaces. Since the iron values of these ores are non-magnetic, the magnetic concentrating methods and apparatus employed on magnetic ores cannot be used. Various methods have been proposed over a period of many years which aimed to separate and concentrate iron values in oölitic ores for blast furnace use but, so far as I am aware, none of those proposals was capable of providing iron values from such ores at commercially practicable costs.

One such proposed method of concentrating oölitic iron ore, which was rather completely investigated on a pilot plant scale, was based on the principle of making the iron values magnetic by a reducing roast and then concentrating them by the methods previously used on magnetic ores. According to this process the ore was crushed into rather coarse form, i. e., about 4-mesh and was roasted at a temperature of about 500° C., using by-product coke oven gas as a heating and reducing agent. Then the roasted ore was ball-milled or ground to finer sizes and classified. The 100-mesh and finer particles from the classifier were passed through a magnetizing coil, were largely dewatered and were passed through a magnetic log washer. This process was non-commercial because of its excessive cost of operation.

Other proposed processes were likewise found to be impractical and non-commercial primarily because of the expense of treating the ore and the large loss of fine ore.

The present invention solves this longstanding problem in a practical, economical and commercially satisfactory manner. It does not involve any expensive and tedious roasting and magnetizing steps and it recovers a satisfactory percentage of fine iron values.

Briefly stated, the present invention includes the steps of reducing the oölitic ore to particles of less than about 8-mesh size although other screen sizes may be employed at this point depending upon the character of the ore and the size to which the ore must be crushed or ground to liberate metallic materials or oxides from the non-metallic material as slime, the iron values of less than 100-mesh size from non-metallic particles and iron values of the larger sizes, combining the slimes and recovering substantially all the iron values therein, and separately recovering and sintering the larger size particles of iron values. The grinding of the ore is so regulated that the iron oxide and lime coatings are so broken away from the silica cores as to limit the grinding or cracking of the silica to a minimum.

The present process is especially suited to use with oölitic iron ores. These ores are believed to have been formed by the deposition of iron values on grains of sand, i. e., silica. At any rate, the ore consists of grains or nodules made up mainly of silica, around which there are layers of iron values. The iron oxide of these ores is in the amorphous form and is mechanically combined with finely divided lime. When the ore is ground the outer layers of iron oxide and lime are broken away from the cores of silica. As a result, it is possible to segregate the main body of the silica on the concentrating table and to reject it while retaining substantially all the iron values with relatively small amounts of silica.

The present invention will be better understood by those skilled in the art from the following specification and the accompanying drawings, in which Fig. 1 is a flow sheet embodying one form of the present invention; and Fig. 2 is a similar flow sheet but showing types of apparatus usable in the different stages thereof.

One embodiment of the present process is illustrated in Fig. 1. As that figure shows, the crude oölitic ore, consisting of metallic material or oxides such as non-magnetic iron values and non-metallic materials such as earth, dirt, rock, gangue and the like, is crushed and charged into a surge bin 1, from which it is controllably fed onto a vibrating screen 2. Water is added to the crushed ore on this screen and material of particle sizes larger than about 8-mesh is separated and is ground or crushed, as by mill 3, and is returned to the screen, as by elevator 4. The material of particle sizes under about 10-mesh is hydraulically separated, as by desliming classifier 5, into two classes of material, viz: a granular product and a slime product. The granular product consists of water containing metallic and non-metallic materials of particle sizes between about 8-mesh and about 100-mesh. The slime consists of a large volume of water containing solids which consist mainly of iron values smaller than about 100-mesh in size with some non-metallic material of corresponding sizes. It is withdrawn through pipe 6.

The granular product is again hydraulically classified, as by classifier 7, which separates the solids into several different sizes. Any slime product which escaped removal in classifier 5 is separated from the coarser materials and this separated slime is discharged through pipe 8 into slime pipe 6. The remaining granular material consisting of metallic and non-metallic solids and separated into several different size groups, is separately delivered to the several concentrating tables 9 and is separated into three classes of material, viz: concentrates, middlings and tailings. The concentrates consist largely of the coarser iron values, the middlings consist largely of the finer iron values most of which still cling to non-metallic material, and the tailings consist largely of non-metallic materials including most of the silica and alumina of the original ore. The middlings are led through a pipe $a$ common to all the tables 9 to hydraulic classifier 10 where the middlings are separated into two classes of material, viz: concentrates and middlings. The concentrates consist mainly of free iron values and they are combined with the concentrates from tables 9. The middlings from classifier 10 are separated, as by a dewatering rake 11, into slime of the character above described and a rake product. The slime obtained from rake 11 is led into pipe 6 and combined with the slime from classifiers 5 and 7. The rake product is reground as by mill 12 to pass through a screen ranging in size from 14- to 20-mesh and is returned to classifier 7.

The concentrates from tables 9 and classifier 10 are passed through pipes $b$ to a dewatering rake 13 and are separated into a slime product and a rake product, and after being separated from much of the accompanying water, as by filter 14, are ready for sintering. The slime is added to that in pipe 6.

The tailings from tables 9 pass through pipe $c$ to a dewatering rake 15 which removes any slime present and adds it to the slime in pipe 6. The rake product from dewatering rake 15, consisting principally of non-metallic solids, is discharged into tailing pond 16.

The combined slimes from classifiers 5 and 7 and dewatering rakes 11, 13 and 15, and containing large quantities of water with iron values under about 100-mesh in particle size, may be treated in any suitable manner for recovery of those iron values. According to one method, identified as method A, this slime is separated by a suitable hydroseparator into overflow material and sludge material. The solids in the overflow material are chiefly iron values. The solids in the sludge material include non-metallic materials with some iron values. This sludge material is treated by a recently developed flotation process which removes the iron values. This process involves the addition of suitable selective oils or reagents which coat the minerals to be floated away and then the further addition of frothing oils which have the ability to pick up the oil or reagent coated minerals and bring them to the surface. Such a process, which is highly satisfactory with oölitic ores, is described in U. S. Patent No. 2,383,467 to Clemmer and Clemmons.

The remaining tailings are returned to dewatering rake 15 for separation of any iron values remaining therein. The iron values obtained from the flotation process are combined with the overflow material from the hydroseparator. The combined material is thickened in a thickener and filtered, and is then ready for sintering in the sintering plant. The water removed during this thickening operation is available for re-use in the mill.

The thickener just mentioned may be like the present Dorr thickener but other types of thickeners may be used if required. A suitable thickener is a mechanical device designed for separating a thin pulp of finely ground solids and water into a thick pulp and clear water overflow. The device consists of a large diameter round tank with the bottom sloping from the periphery towards the center sludge discharge well and provided with power driven revolving rakes so designed as to rake thickened sludge along the bottom and towards the discharge in the center. The clear water overflows around the entire periphery into a gathering launder. The thin pulp is fed into the tank at the top surface and usually at the center of the tank.

The hydroseparator just referred to may be of the Dorr type or of various other types. A suitable hydroseparator is essentially a shallow thickener. The device is used to separate fine particles of solids from coarse particles of solids contained in a pulp. The depth is determined by the degree of separation desired and the separation can also be controlled within limits by the rate of feed and the rate of coarse pulp discharge from the bottom of the tank. As in the case of a thickener revolving rakes are provided to move the settled material along the bottom of the tank and towards the center discharge well.

According to another method, identified as method B, the combined slimes from classifiers 5 and 7 and rakes 11, 13 and 15, are thickened, as by a Dorr thickener 20 which removes much of the water for re-use in the mill and leaves a sludge which is filtered in filter 21 and is then ready for sintering in the sintering plant.

Although both of methods A and B recover substantially all the iron values in the slimes and hence is usable, the grade of the product recovered by method A is somewhat higher than that recovered by method B, i. e., it contains a higher percentage of iron.

Fig. 2 shows diagrammatically suitable apparatus suitably arranged for carrying out the process depicted in Fig. 1.

In Fig. 2 the surge bin 1, which may be of any suitable construction, serves as a storage bin for the crushed ore which is to be fed to the vibrating screen 2. In this case two screens are shown and they may be of any well-known type suitable for sifting the particles of ore and classifying them into two sizes, viz: those above and those below about 8-mesh. The larger particles with some of the water are conducted to mill 3 where the particles are reduced in size and returned to the screens 2 by way of an elevator 4. The particles smaller than about 8-mesh flow to a desliming classifier 5 which may be of any one of several types but the Dorr bowl classifier has been found to be satisfactory. This classifier includes a chamber in which the density of the ground ore and water is so controlled that particles smaller than about 100-mesh are overflowed while the coarser solids settle to the bottom whence rakes remove the same.

The hydraulic classifier 7 may be of any suitable construction, but the Deister Concenco classifier has given good satisfaction. This classifier is a multiple cell device and each cell is provided with an inlet for water at the bottom thereof so as to cause an upward flow of water through which the granular product from classifier 5 must settle. The velocity of water flow is so regulated that it is highest in one cell, and progressively lower in the successive cells. The coarsest and heaviest solids settle to the bottom of the cell in which the velocity of water flow is greatest. The remaining material passes successively through the several cells wherein the water velocity is successively lower and progressively smaller solids settle out. In this manner the granular product is separated into several classes differing in size and weight of solids. Although only one set of tables 9 is shown on Fig. 2, it will be understood that there is a similar set for each of the classifiers 7.

The solids which settle to the bottoms of the several different cells of classifier 7 are drawn off through spigots in the cells and are separately led to concentrating tables 9. While various types of concentrating tables may be used, Deister diagonal deck tables have been found to be satisfactory. Each of these tables is generally rectangular in shape and may be tilted so as to bring one long side above the other side so that the top of the table is inclined downwardly from one long side to the other long side. Extending lengthwise of the top surface of each table is a plurality of spaced, parallel grooves or riffles. Means is provided for giving each table an endwise jerking movement. When water and ore particles of a given class or size are delivered onto the upper side of the surface of the table near one end thereof, the heavy particles consisting mainly of iron values collect behind the riffles and are moved along the riffles to the far end of the table by the jerky motion of the table and are there collected as concentrates. The lighter particles, consisting mainly of non-metallic materials, flow more or less straight across the table and are collected at the lower side edge of the tables as tailings. Particles of intermediate weight and consisting of some iron values and some non-metallic materials are carried some distance along the table by the jerky motion thereof but are eventually discharged at the lower side and end edge of the table and are collected as middlings.

Hydraulic classifier 10 may be generally similar to classifier 7 described hereinabove. It serves to separate from the true middlings any free iron values therein before the true middlings are passed to the dewatering rake 11 where they are separated into slime and a rake product. The true middlings are particles of combined metallic and non-metallic materials and must be reground to liberate the metallic materials. Any suitable dewatering rake may be used but the Dorr device has been found to be satisfactory. This device includes a container having a sloping bottom and rakes which drag the coarse solids out of large quantities of water and permits the smaller solids to rise to the overflow end of the device, whence they may overflow as slime, while the larger particles are settled and raked to the upper end of the container.

The following round, approximate figures show results which have been realized by application of this invention to Alabama oölitic ore. The crude ore entering the surge bin contained 34.5% of iron, 25% of silica, 4% of alumina and 10.5% of lime. The tailings from the concentrating tables carried away 70% of the total silica and alumina. The combined concentrates contained 85% of the total iron of the ore and was made up of table concentrates amounting to 51% of the total iron of the ore and combined slimes amounting to 34% of the total iron of the ore. The combined slime solids were made up of 43% of iron, 18% of silica and alumina and 8% of lime. The tailing slimes contained 10% of the total iron recovered and a similar amount was recovered from the middlings slimes. Recoveries of 85% of the total iron value of such ore have been made by this process during the past year of commercial operation during which about 21,000 tons of iron values were recovered monthly from ores which theretofore were useless.

It will be understood from the foregoing disclosure that the present process is especially suited to application to oölitic iron ores. These ores are crushed or ground to pass through about an 8-mesh screen. The grinding or crushing of the ore which may take place in a conventional rod mill is controlled as to rod load, size of rods, speed of rotation and pulp density so as to give a so-called "scuffing" action in which the layers of iron oxide and lime are broken away from, or shelled off of, the cores or kernels of silica. Care is taken to keep the breaking or shattering of the silica grains or cores at a minimum. The major portion of the silica of the thus crushed or ground ore may be segregated and eliminated from the system by the concentrating tables. This leaves the iron values in the slimes relatively free of silica and makes them an acceptable product for use in the blast furnace. The iron values in the slimes may be recovered by dewatering and filtering the slimes prior to sintering.

This application is a continuation-in-part of my copending application Serial No. 626,683 filed November 5, 1945.

It will be noted from the foregoing figures that a considerable part of the original lime content of the ore was recovered with the iron values in the slimes and table concentrates. Such recovery is a distinct advantage for the lime acts as a fluxing agent for the ore in the blast furnace.

Having thus described the present invention so that others skilled in the art may be able to understand and practice the same, I state that what I desire to secure by Letters Patent is defined in what is claimed.

What is claimed is:

1. The method of concentrating iron values contained in oölitic iron ore which includes the steps of subjecting the aqueous pulp of oölitic iron ore particles to settling in a restricted zone and inducing a counterflow of water to produce a settled granular product containing primarily the particles larger than 100-mesh and a slime product containing only particles under 100-mesh, passing said granular material over a concentrating table and thereby separating said granular material into concentrates containing iron values, middlings containing iron values locked in non-metallic material and some free fine iron values, and tailings consisting of non-metallic material, separating a concentrate of the fine iron values from said middlings by a multiple cell hindered settling classification, dewatering the table and free iron values concentrates and recovering the slime therefrom, dewatering and thereby separating slimes from said middlings, dewatering and thereby separating slimes from said tailings, combining the several slimes and recovering the iron values therein, and collecting said concentrates.

2. The method of concentrating iron values contained in oölitic iron ore which includes the steps of subjecting the aqueous pulp of oölitic iron ore particles to settling in a restricted zone and inducing a counterflow of water to produce a settled granular product containing primarily the particles larger than 100-mesh and a slime product containing only particles under 100-mesh, passing said granular material over a concentrating table and thereby separating said granular material into concentrates containing iron values, middlings containing iron values locked in non-metallic material and some free fine iron values, and tailings consisting of non-metallic material, separating a concentrate of the fine iron values from said middlings by a multiple cell hindered settling classification, dewatering the table and free iron values concentrates and recovering the slime therefrom, dewatering and thereby separating slimes from said middlings, combining the several slimes and recovering the iron values therein, and collecting said concentrates.

3. The method of concentrating iron values contained in oölitic iron ore which includes the steps of subjecting the aqueous pulp of oölitic iron ore particles to settling in a restricted zone and inducing a counterflow of water to produce a settled granular product containing primarily the particles larger than 100-mesh and a slime product containing only particles under 100-mesh, passing said granular material over a concentrating table and thereby separating said granular material into concentrates containing iron values, middlings containing iron values locked in non-metallic material and some free fine iron values, and tailings consisting of non-metallic material, separating a concentrate of the fine iron values from said middlings by a multiple cell hindered settling classification, dewatering the table and free iron values concentrates and recovering the slime therefrom, dewatering and thereby separating slimes from said tailings, combining the several slimes and recovering the iron values therein, and collecting said concentrates.

4. The method of concentrating iron values contained in oölitic iron ore which includes the steps of subjecting the aqueous pulp of oölitic iron ore particles to settling in a restricted zone and inducing a counterflow of water to produce a settled granular product containing primarily the particles larger than 100-mesh and a slime product containing only particles under 100-mesh, passing said granular material over a concentrating table and thereby separating said granular material into concentrates containing iron values, middlings containing iron values locked in non-metallic material and some free fine iron values, and tailings consisting of non-metallic material, separating a concentrate of the fine iron values from said middlings by a multiple cell hindered settling classification, dewatering the table and free iron values concentrates and recovering the slime therefrom, combining the said slimes and recovering the iron values therein, and collecting said concentrates.

OSCAR LEE.

REFERENCES CITED

The following references are of record in the file of this patent:

UNITED STATES PATENTS

| Number | Name | Date |
|---|---|---|
| 1,939,119 | Holt | Dec. 12, 1933 |

OTHER REFERENCES

Bureau of Mines Information Circular S. C. 6852, Sept. 1935, pages 22, 23, 28, 29, 31, 32, 33, 35, 36, Figures 13, 14, 15.